(12) United States Patent
Nomura

(10) Patent No.: US 11,935,702 B2
(45) Date of Patent: Mar. 19, 2024

(54) MULTILAYER CERAMIC ELECTRONIC COMPONENT AND CONDUCTIVE PASTE FOR RESIN ELECTRODE

(71) Applicant: Murata Manufacturing Co., Ltd., Nagaokakyo (JP)

(72) Inventor: Yoshiyuki Nomura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 95 days.

(21) Appl. No.: 17/530,503

(22) Filed: Nov. 19, 2021

(65) Prior Publication Data
US 2022/0189699 A1 Jun. 16, 2022

(30) Foreign Application Priority Data
Dec. 11, 2020 (JP) .................. 2020-206359

(51) Int. Cl.
| | |
|---|---|
| H01G 4/30 | (2006.01) |
| H01G 4/008 | (2006.01) |
| H01G 4/012 | (2006.01) |
| H01G 4/12 | (2006.01) |

(52) U.S. Cl.
CPC .............. *H01G 4/30* (2013.01); *H01G 4/008* (2013.01); *H01G 4/012* (2013.01); *H01G 4/1218* (2013.01)

(58) Field of Classification Search
CPC .......... H01G 4/30; H01G 4/008; H01G 4/012; H01G 4/1218
See application file for complete search history.

(56) References Cited

U.S. PATENT DOCUMENTS

| | | | | |
|---|---|---|---|---|
| 2003/0090883 A1* | 5/2003 | Asahi | ...................... | H01L 25/16 257/E21.705 |
| 2007/0256857 A1* | 11/2007 | Kamikoriyama | ...... | H05K 1/095 174/257 |
| 2007/0273047 A1* | 11/2007 | Nakai | .................. | H05K 1/0242 257/784 |

(Continued)

FOREIGN PATENT DOCUMENTS

| | | | |
|---|---|---|---|
| JP | 2005223057 A | * | 8/2005 |
| JP | 2011233452 A | | 11/2011 |

(Continued)

OTHER PUBLICATIONS

Nomura, "Multilayer Ceramic Electronic Component and Conductive Paste for Resin Electrode", U.S. Appl. No. 18/230,262, filed Aug. 4, 2023.

(Continued)

*Primary Examiner* — Michael P McFadden
(74) *Attorney, Agent, or Firm* — Keating & Bennett, LLP

(57) ABSTRACT

A multilayer ceramic capacitor includes a ceramic element body including ceramic layers and internal electrode layers, and a pair of external electrodes on both end surfaces of the ceramic element body so as to be electrically connected to the internal electrode layers. Each of the external electrodes includes a base electrode layer and a resin external electrode layer stacked on the base electrode layer. The resin external electrode layer includes a thermosetting resin and a metal powder and amine, isocyanate, epoxy, mercapto, and/or ureido silane coupling agents.

15 Claims, 4 Drawing Sheets

(56) References Cited

U.S. PATENT DOCUMENTS

| | | | | |
|---|---|---|---|---|
| 2014/0367152 A1* | 12/2014 | Lee | ........................ | H01G 4/232 |
| | | | | 361/301.4 |
| 2015/0364256 A1* | 12/2015 | Zenzai | ..................... | C09D 5/24 |
| | | | | 252/514 |
| 2016/0093442 A1* | 3/2016 | Nagamoto | ........... | H01G 4/0085 |
| | | | | 361/301.4 |
| 2017/0294268 A1* | 10/2017 | Katsuta | .................. | H01G 4/232 |

FOREIGN PATENT DOCUMENTS

| JP | 2013-218831 A | 10/2013 |
|---|---|---|
| JP | 2015-111576 A | 6/2015 |
| JP | 2016-106356 A | 6/2016 |

OTHER PUBLICATIONS

Office Action in JP2020-206359, dated Sep. 5, 2023, 3 pages.

* cited by examiner

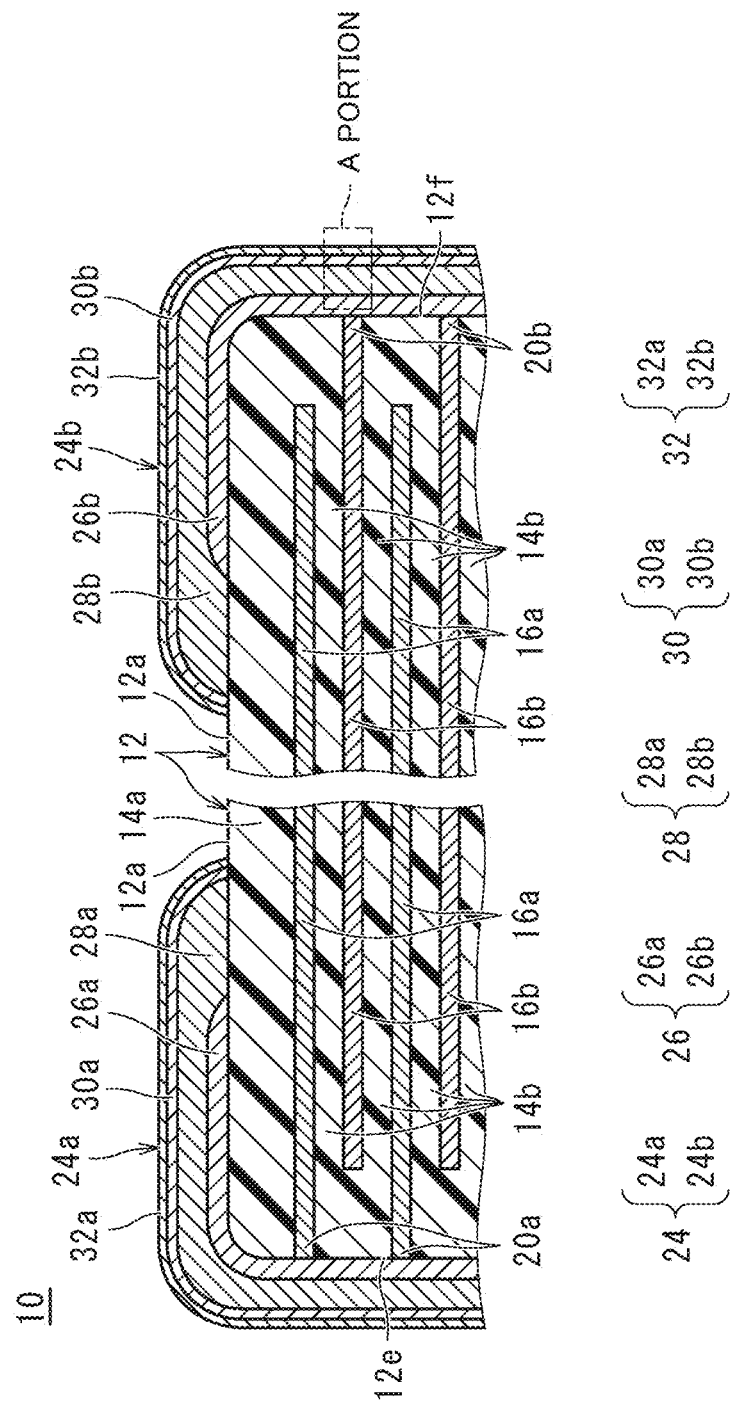

PRESENT INVENTION

COMPARATIVE EXAMPLE

MULTILAYER CERAMIC ELECTRONIC COMPONENT AND CONDUCTIVE PASTE FOR RESIN ELECTRODE

CROSS REFERENCE TO RELATED APPLICATIONS

This application claims the benefit of priority to Japanese Patent Application No. 2020-206359 filed on Dec. 11, 2020. The entire contents of this application are hereby incorporated herein by reference.

BACKGROUND OF THE INVENTION

1. Field of the Invention

The present invention relates to a multilayer ceramic electronic component including, for example, a multilayer ceramic capacitor, and a conductive paste for a resin electrode.

2. Description of the Related Art

Generally, when stress concentrates on the ends of the external electrodes of a multilayer ceramic electronic component, cracks may occur in the ceramic body. As a measure against this, conventionally, a structure in which a conductive resin electrode layer is stacked on a Cu electrode layer that is the base of an external electrode has been proposed.

Japanese Patent Laid-Open No. 2016-106356 discloses a technique for a conductive resin paste that can be heat-treated at a low temperature of 200° C. or less and can provide a conductive film having sufficiently low electrical resistivity. More specifically, examples in which the surface treatment of an Ag powder is performed using the Ag powder and stearic acid and the like are disclosed.

Generally, when the void ratio of a conductive resin electrode layer is high in an external electrode having the above-described structure including a conductive resin electrode layer, the relaxation characteristics of the resin decrease to cause cracks in a ceramic element body.

It has been found that when stearic acid and the like are used in a conductive resin paste used for the formation of a conductive resin electrode layer as conventionally done, not only does the void ratio of the conductive resin electrode layer increase to decrease the relaxation characteristics of the resin to easily cause cracks in a ceramic element body, but sufficient adhesiveness between the conductive resin electrode layer and the ceramic element body is not obtained to cause the peeling of the external electrode.

SUMMARY OF THE INVENTION

Preferred embodiments of the present invention provide multilayer ceramic electronic components in each of which, not only is a void ratio of conductive resin electrode layers low to improve relaxation characteristics of the resin to avoid cracks in a ceramic element body, but also adhesiveness between the conductive resin electrode layers and a ceramic element body is improved, and deterioration of electrical characteristics is reduced or prevented. Preferred embodiments of the present invention also provide conductive pastes for a resin electrode.

A multilayer ceramic electronic component according to a preferred embodiment of the present invention includes a ceramic element body including a plurality of ceramic layers, a plurality of internal electrode layers, a first major surface and a second major surface that face each other in a stacking direction, a first side surface and a second side surface that face each other in a width direction orthogonal or substantially orthogonal to the stacking direction, and a first end surface and a second end surface that face each other in a length direction orthogonal or substantially orthogonal to the stacking direction and the width direction, and a pair of external electrodes connected to the internal electrode layers and disposed on the end surfaces, on the first and second major surfaces, and on the first and second side surfaces, wherein each of the pair of external electrodes includes a base electrode layer connected to the internal electrode layers, and a resin external electrode layer stacked on the base electrode layer, and the resin external electrode layer includes at least one of amine, isocyanate, epoxy, mercapto, or ureido silane coupling agents.

A conductive paste for a resin electrode according to a preferred embodiment of the present invention includes at least one of amine, isocyanate, epoxy, mercapto, or ureido silane coupling agents.

According to preferred embodiments of the present invention, multilayer ceramic electronic components are obtained, and in each of which, the dispersibility between the metal powder and resin of resin external electrode layers improves to decrease the void ratio of the resin external electrode layers, the relaxation characteristics of the resin are excellent, and cracks do not easily occur in a ceramic element body. Further, multilayer ceramic electronic components are obtained, and in each of which, resin external electrode layers and a ceramic element body are chemically bonded via a silane coupling agent, and therefore the adhesiveness between the resin external electrode layers and the ceramic element body is improved, and the deterioration of electrical characteristics is reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is an enlarged cross-sectional view of the external electrodes and their vicinities in the cross-sectional view of FIG. 2.

DETAILED DESCRIPTION OF THE PREFERRED EMBODIMENTS

Preferred embodiments of the present invention will be described in detailed below with reference to the drawings.

1. Multilayer Ceramic Electronic Component

A multilayer ceramic electronic component according to a preferred embodiment of the present invention will be described. The multilayer ceramic electronic component will be described below using a multilayer ceramic capacitor as an example. This preferred embodiment will be described using an ordinary two-terminal capacitor as an example, but the multilayer ceramic electronic component is not limited to this and can also be multilayer ceramic inductors, multilayer ceramic thermistors, multilayer ceramic piezoelectric components, and the like.

Figure 1:
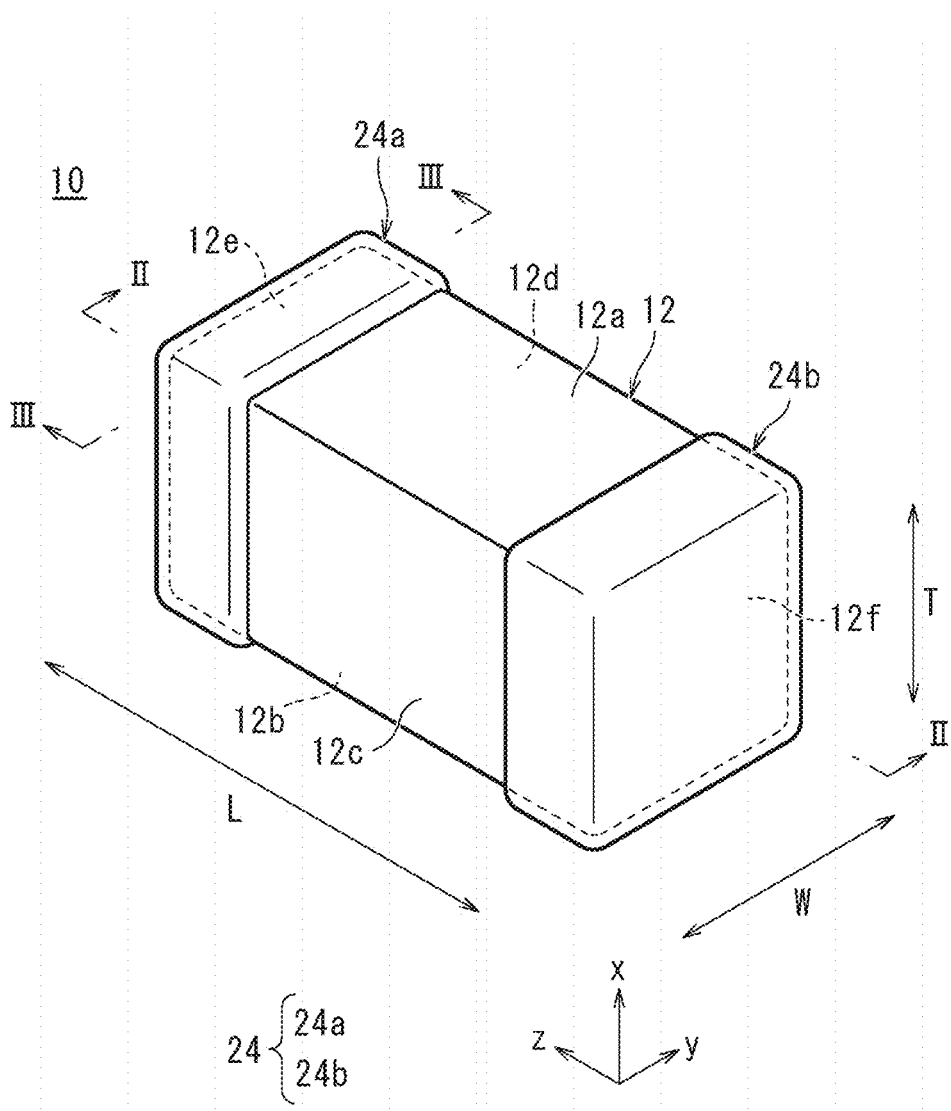
FIG. 1 is a perspective view showing one example of a multilayer ceramic electronic component according to a preferred embodiment of the present invention.
Figure 2:
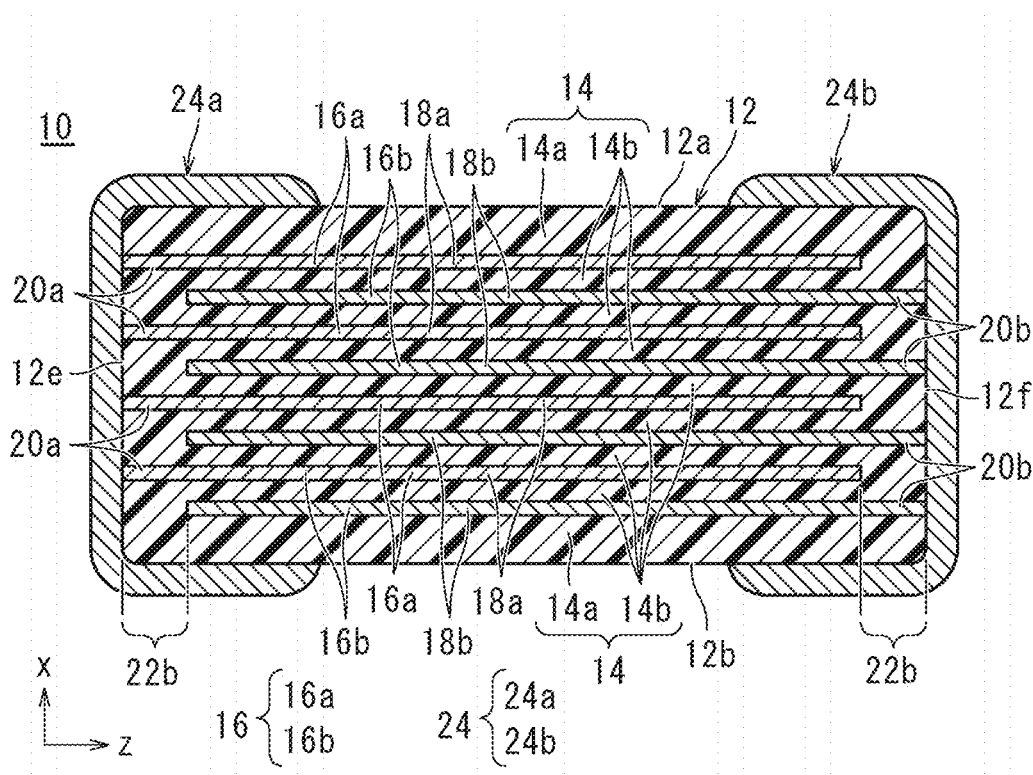
FIG. 2 is a cross-sectional view on the line II-II of FIG. 1.
Figure 3:
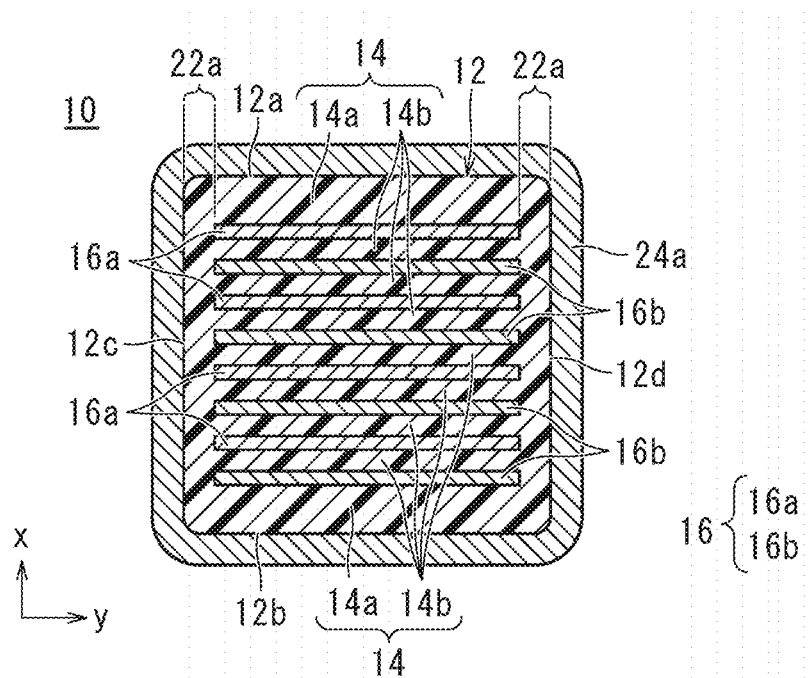
FIG. 3 is a cross-sectional view on the line III-III of FIG. 1.
Figure 5A:
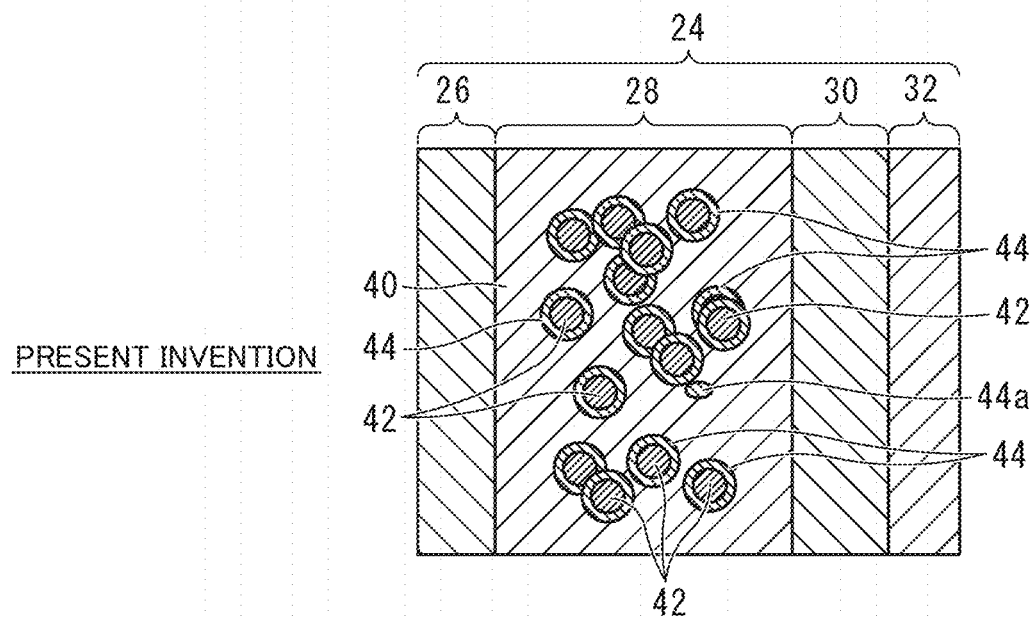
FIG. 5A is an enlarged schematic cross-sectional view of the A portion in the cross-sectional view of FIG. 4.
Figure 5B:
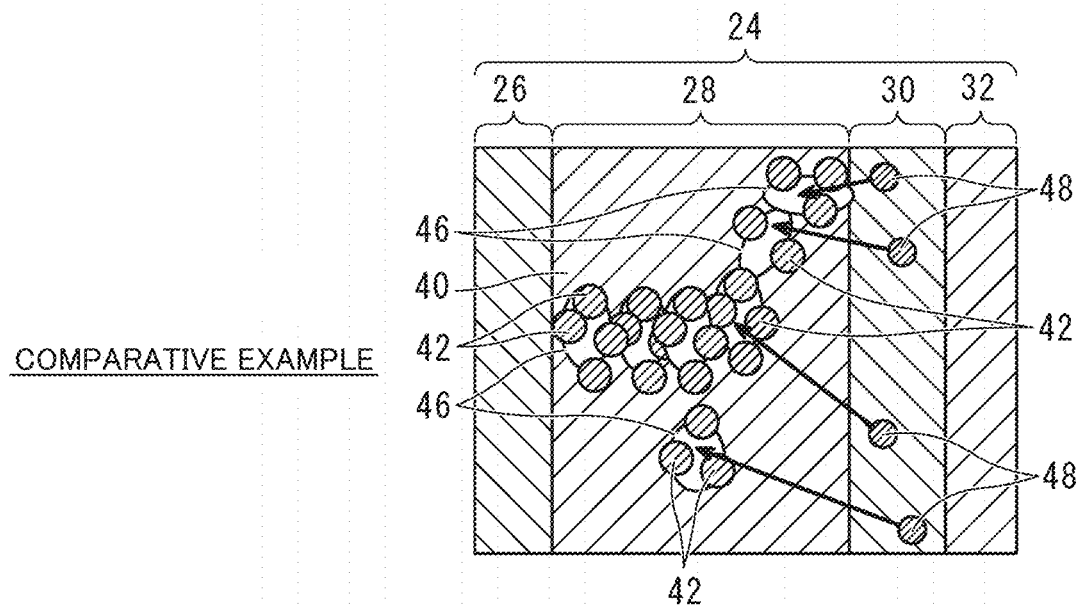
FIG. 5B is an enlarged schematic cross-sectional view for comparison with FIG. 5A.

FIG. 1 is a perspective view showing one example of a multilayer ceramic capacitor 10. FIG. 2 is a cross-sectional view on the line II-II of FIG. 1, and FIG. 3 is a cross-sectional view on the line III-III of FIG. 1. FIG. 4 is an enlarged cross-sectional view of the external electrodes and their vicinities in the cross-sectional view of FIG. 2. FIG. 5A is an enlarged schematic cross-sectional view of the A portion in FIG. 4. FIG. 5B is an enlarged schematic cross-sectional view for comparison with FIG. 5A.

Multilayer ceramic capacitor 10 includes a rectangular or substantially rectangular parallelepiped-shaped ceramic element body 12 and two external electrodes 24.

Ceramic element body 12 includes a plurality of ceramic layers 14 and a plurality of internal electrode layers 16 that are stacked. Further, ceramic element body 12 includes a first major surface 12a and a second major surface 12b that face each other in a stacking direction x, a first side surface 12c and a second side surface 12d that face each other in a width direction y orthogonal or substantially orthogonal to stacking direction x, and a first end surface 12e and a second end surface 12f that face each other in a length direction z orthogonal or substantially orthogonal to stacking direction x and width direction y. The dimensions of ceramic element body 12 are not particularly limited. However, in ceramic element body 12, the dimension in length direction z is not necessarily longer than the dimension in width direction y.

In ceramic element body 12, the corner portions and the ridge portions are preferably rounded. The corner portion is a portion in which three adjacent surfaces of ceramic element body intersect, and the ridge portion is a portion in which two adjacent surfaces of ceramic element body 12 intersect. Irregularities or the like may be provided on a portion or all of first major surface 12a and second major surface 12b, first side surface 12c and second side surface 12d, and first end surface 12e and second end surface 12f.

The ceramic layers 14 of ceramic element body 12 include outer layer portions 14a and inner layer portions 14b. Outer layer portions 14a are located on the first major surface 12a side and second major surface 12b side of ceramic element body 12 and are ceramic layers 14 located between first major surface 12a and internal electrode layer 16 closest to first major surface 12a, and ceramic layers 14 located between second major surface 12b and internal electrode layer 16 closest to second major surface 12b. The regions sandwiched between both outer layer portions 14a are inner layer portions 14b. The thickness of outer layer portion 14a is preferably about 20 μm or more and about 300 μm or less, for example.

The number of stacked ceramic layers 14 is not particularly limited but is preferably, for example, 15 or more and 1550 or less, including outer layer portions 14a.

The dimensions of ceramic element body 12 are not particularly limited, but it is preferable that the dimension in length direction z is about 0.58 mm or more and about 5.6 mm or less, the dimension in width direction y is about 0.28 mm or more and about 4.9 mm or less, and the dimension in stacking direction x is about 0.28 mm or more and about 2.9 mm or less, for example.

Ceramic layers 14 can be made of, for example, a dielectric material. As the dielectric material, for example, a dielectric ceramic including a main component such as $BaTiO_3$, $CaTiO_3$, $SrTiO_3$, or $CaZrO_3$ can be used. When the dielectric material is included as a main component, for example, a material to which an accessory component at a lower content than the main component, such as a Mn compound, an Fe compound, a Cr compound, a Co compound, or a Ni compound, is added may be used according to the desired characteristics of ceramic element body 12.

When a piezoelectric ceramic material is used for ceramic element body 12, the multilayer ceramic electronic component defines and functions as a ceramic piezoelectric element. Specific examples of the piezoelectric ceramic material include PZT (lead zirconate titanate)-based ceramic materials.

When a semiconductor ceramic is used for ceramic element body 12, the multilayer ceramic electronic component functions as a thermistor element. Specific examples of the semiconductor ceramic material include spinel-based ceramic materials.

When a magnetic ceramic material is used for ceramic element body 12, the multilayer ceramic electronic component defines and functions as an inductor element. When the multilayer ceramic electronic component defines and functions as an inductor element, internal electrode layers 16 define a coil-shaped conductor. Specific examples of the magnetic body ceramic material include ferrite ceramic materials.

The thickness of ceramic layer 14 after firing is preferably about 0.48 μm or more and about 20 μm or less, for example.

Ceramic element body 12 includes, for example, a plurality of first internal electrode layers 16a and a plurality of second internal electrode layers 16b having a rectangular or substantially rectangular shape, as the plurality of internal electrode layers 16. The plurality of first internal electrode layers 16a and the plurality of second internal electrode layers 16b are embedded so as to be alternately disposed at equal or substantially equal intervals along the stacking direction x of ceramic element body 12 with ceramic layers 14 sandwiched therebetween.

First internal electrode layer 16a includes a first opposed electrode portion 18a opposed to second internal electrode layer 16b, and a first extraction electrode portion 20a that is located on one end side of first internal electrode layer 16a and extends from first opposed electrode portion 18a to the first end surface 12e of ceramic element body 12. First extraction electrode portion 20a includes an end extending to first end surface 12e and being exposed.

Second internal electrode layer 16b includes a second opposed electrode portion 18b opposed to first internal electrode layer 16a, and a second extraction electrode portion 20b that is located on one end side of second internal electrode layer 16b and extending from second opposed electrode portion 18b to the second end surface 12f of ceramic element body 12. Second extraction electrode portion 20b includes an end extending to second end surface 12f and being exposed.

Ceramic element body 12 includes the side portions (hereinafter referred to as "W gaps") 22a of ceramic element body 12 between first ends of first opposed electrode portions 18a and second opposed electrode portions 18b in width direction y and first side surface 12c and between second ends of first opposed electrode portions 18a and second opposed electrode portions 18b in width direction y and second side surface 12d. Further, ceramic element body 12 includes the ends (hereinafter referred to as "L gaps") 22b of ceramic element body 12 between the ends of first internal electrode layers 16a opposite to first extraction electrode portions 20a and second end surface 12f and between the ends of second internal electrode layer 16b opposite to second extraction electrode portion 20b and first end surface 12e.

Internal electrode layers 16 can be made of, for example, an appropriate conductive material such as a metal such as Ni, Cu, Ag, Pd, or Au, or an alloy including at least one of the metals, such as a Ag—Pd alloy. Internal electrode layers 16 may further include dielectric particles based on the same composition as the ceramic included in ceramic layers 14.

The thickness of internal electrode layer 16 is preferably about 0.3 μm or more and about 2.0 μm or less, for example. The number of internal electrode layers 16 is preferably 15 or more and 1550 or less, for example.

External electrodes 24 are disposed on the first end surface 12e side and second end surface 12f side of ceramic element body 12. External electrodes 24 include a first external electrode 24a and a second external electrode 24b.

First external electrode 24a is provided on the surface of the first end surface 12e of ceramic element body 12 and extends from first end surface 12e to cover a portion of each of first major surface 12a and second major surface 12b and first side surface 12c and second side surface 12d. In this case, first external electrode 24a is electrically connected to the first extraction electrode portions 20a of first internal electrode layers 16a.

Second external electrode 24b is provided on the surface of the second end surface 12f of ceramic element body 12 and extends from second end surface 12f to cover a portion of each of first major surface 12a and second major surface 12b and first side surface 12c and second side surface 12d. In this case, second external electrode 24b is electrically connected to the second extraction electrode portions 20b of second internal electrode layers 16b.

In ceramic element body 12, the first opposed electrode portions 18a of first internal electrode layers 16a and the second opposed electrode portions 18b of second internal electrode layers 16b are opposed to each other via ceramic layers 14, and thus capacitance is produced. Therefore, capacitance can be obtained between first external electrode 24a to which first internal electrode layers 16a are connected and second external electrode 24b to which second internal electrode layers 16b are connected, and the characteristics of the capacitor are provided.

First external electrode 24a and second external electrode 24b include, for example, base electrode layers 26 connected to internal electrode layers 16, resin external electrode layers 28 stacked on base electrode layers 26, and Ni plating layers 30 and Sn plating layers 32 stacked on resin external electrode layers 28.

Base electrode layers 26 include a first base electrode layer 26a and a second base electrode layer 28b. First base electrode layer 26a is provided on the surface of the first end surface 12e of ceramic element body 12 and extends from first end surface 12e to cover a portion of each of first major surface 12a and second major surface 12b and first side surface 12c and second side surface 12d.

Second base electrode layer 26b is provided on the surface of the second end surface 12f of ceramic element body 12 and extends from second end surface 12f to cover a portion of each of first major surface 12a and second major surface 12b and first side surface 12c and second side surface 12d. First base electrode layer 26a may be provided on only the surface of the first end surface 12e of ceramic element body 12, and second base electrode layer 26b may be provided on only the surface of the second end surface 12f of ceramic element body 12.

Base electrode layer 26 includes a conductive metal and a glass component. The metal of base electrode layer 26 includes, for example, at least one selected from Cu, Ni, Ag, Pb, a Ag—Pb alloy, Au, or the like. The glass of base electrode layer 26 includes, for example, at least one selected from B, Si, Pd, Ba, Mg, Al, Li, or the like. Base electrode layer 26 may include a plurality of layers. Base electrode layers 26 are obtained by applying a conductive paste including glass and a metal to ceramic element body 12 and baking it and may be obtained by firing the conductive paste simultaneously with ceramic layers 14 and internal electrode layers 16 or by firing ceramic layers 14 and internal electrode layers 16 and then baking the conductive paste, for example. The thickness of the thickest portion of base electrode layer 26 is preferably about 10 μm or more and about 150 μm or less, for example.

Base electrode layers 26 located on first end surface 12e and second end surface 12f have a shape in which the thickness of the central portion is thicker than that of other portions. Thus, the connection and contact angle of solder to the plating on external electrodes 24 is acute, and a component in which the direction of stress applied from the solder to the plating during a thermal shock cycle is parallel or substantially parallel to the plating plane is strong, and therefore the advantageous effect of decreasing the probability of the occurrence of solder cracks can be obtained. The thickness of base electrode layers 26 on first major surface 12a and second major surface 12b and on first side surface 12c and second side surface 12d is preferably about 5 μm or more and about 20 μm or less, for example.

Resin external electrode layers 28 include a first resin external electrode layer 28a and a second resin external electrode layer 28b.

First resin external electrode layer 28a covers first base electrode layer 26a. Specifically, first resin external electrode layer 28a is preferably provided on first end surface 12e on the surface of first base electrode layer 26a and also extends to first major surface 12a and second major surface 12b and first side surface 12c and second side surface 12d on the surface of first base electrode layer 26a. First resin external electrode layer 28a may be provided on only the surface of first base electrode layer 26a on first end surface 12e or may cover the surface of first base electrode layer 26a on first end surface 12e, and a portion of the surface of first base electrode layer 26a on first major surface 12a and second major surface 12b and first side surface 12c and second side surface 12d.

Similarly, second resin external electrode layer 28b covers second base electrode layer 26b. Specifically, second resin external electrode layer 28b is preferably provided on second end surface 12f on the surface of second base electrode layer 26b and also extends first major surface 12a and second major surface 12b and first side surface 12c and second side surface 12d on the surface of second base electrode layer 26b. Second resin external electrode layer 28b may be provided on only the surface of second base electrode layer 26b on second end surface 12f or may cover the surface of second base electrode layer 26b disposed on second end surface 12f, and a portion of the surface of second base electrode layer 26b disposed on first major surface 12a and second major surface 12b and first side surface 12c and second side surface 12d.

The thickness of resin external electrode layer 28 is preferably, for example, about 10 μm or more and about 200 μm or less.

As shown in FIG. 5A, resin external electrode layer 28 includes, for example, a silane coupling agent 44 of any one or more selected from amine, isocyanate, epoxy, mercapto, and ureido silane coupling agents, a thermosetting resin 40, and a metal powder (conductive filler) 42. The silane coupling agent 44 is included in thermosetting resin 40, covers the surface of metal powder 42, or is present at the interface between thermosetting resin 40 and ceramic element body 12. A portion 44a of the silane coupling agent 44 that covers the surface of metal powder 42 peels from the surface of metal powder 42 and is included in thermosetting resin 40. The silane coupling agent may be provided in thermosetting resin 40, on the surface of metal powder 42, and at the interface between thermosetting resin 40 and ceramic element body 12. In the present preferred embodiment, the silane coupling agent covers the surface of metal powder 42. In resin external electrode layer 28, the content of the amine, isocyanate, epoxy, mercapto, and/or ureido silane coupling agents based on thermosetting resin 40 is preferably about 0.1 wt % or more and about 10 wt % or less, for example.

As shown in FIG. 5A, when silane coupling agent 44 of any one or more selected from, for example, amine, isocyanate, epoxy, mercapto, and ureido silane coupling agents is added, the wettability between thermosetting resin 40 and metal powder 42 is good, and thermosetting resin 40 is not unevenly distributed, and therefore the lumps of thermosetting resin 40 are small (the dispersibility is good). Further, the void ratio of resin external electrode layer 28 decreases, and multilayer ceramic capacitor 10 in which the relaxation characteristics of the resin are excellent, and cracks do not easily occur in ceramic element body 12 is obtained. The equivalent series resistance value (ESR) can also be decreased.

When the silane coupling agent 44 is provided at the interface between thermosetting resin 40 and ceramic element body 12, thermosetting resin 40 and the ceramic element body are chemically bonded via silane coupling agent 44, and therefore the adhesiveness between thermosetting resin 40 and ceramic element body 12 can be improved. Thus, the peeling of resin external electrode layer 28 is reduced or prevented, and the deterioration of electrical characteristics can be reduced or prevented.

For comparison, in FIG. 5B, a resin external electrode layer 28 in which the amine, isocyanate, epoxy, mercapto, and/or ureido silane coupling agents 44 are not included is also described. As shown in FIG. 5B, when the amine, isocyanate, epoxy, mercapto, and/or ureido silane coupling agents are not added, the wettability between a thermosetting resin 40 and a metal powder 42 is poor, and thermosetting resin 40 is unevenly distributed, and therefore the lumps of thermosetting resin 40 are large (the dispersibility deteriorates). Further, the void ratio of resin external electrode layer 28 increases, Ni particles 48 in Ni plating layer 30 easily enter voids 46, and cracks easily occur in resin external electrode layer 28. When voids 46 are present at the boundary between ceramic element body 12 and resin external electrode layer 28, cracks easily occur in ceramic element body 12. When voids 46 in resin external electrode layer 28 increase, the cure shrinkage of thermosetting resin 40 decreases, and the equivalent series resistance value (ESR) increases.

The amine, isocyanate, epoxy, mercapto, and/or ureido silane coupling agents 44 need not cover all of the surface of metal powder 42 and may only cover at least a portion. Further, all metal powder 42 need not be covered with the amine, isocyanate, epoxy, mercapto, and/or ureido silane coupling agents 44, and a portion of metal powder 42 may not be covered with the amine, isocyanate, epoxy, mercapto, and/or ureido silane coupling agents 44.

The amine, isocyanate, epoxy, mercapto, and/or ureido silane coupling agents include, for example, KBM-303, KBM-402, KBM-403, KBE-402, KBE-403, KBM-602, KBM-603, KBM-903, KBE-903, KBE-9103, KBM-573, KBM-575, KBE-585, KBM-802, KBM-803, and KBM-9007N (manufactured by Shin-Etsu Chemical Co., Ltd.), N-[2-(N-vinylbenzylamino)ethyl]-3-aminopropyltrimethoxysilane hydrochloride, N-[3-(trimethoxysilyl)propyl]butan-1-amine, 3-aminopropyltrimethoxysilane, 3-(N,N-dimethylamino)propyl]trimethoxysilane, 3-(diethylamino)propyl]trimethoxysilane, 3-(6-aminohexylamino)propyl]trimethoxysilane, 3-(2-aminoethylamino)propyltrimethoxysilane, (3-mercaptopropyl)trimethoxysilane, (3-mercaptopropyl)triethoxysilane, 3-mercaptopropyl (dimethoxy)methylsilane, (3-ureidopropyl)trimethoxysilane, and 3-ureidopropyltriethoxysilane (40-52% methanol solution) (manufactured by TOKYO CHEMICAL INDUSTRY CO., LTD.), and (isocyanatemethyl)methyldimethoxysilane, 3-isocyanatepropyltrimethoxysilane, tris(3-trimethoxysilylpropyl)isocyanurate, (3-triethoxysilylpropyl)-t-butylcarbamate, triethoxysilylpropylethylcarbamate, 3-thiocyanatopropyltriethoxysilane, and 3-mercaptopropyltriethoxysilane (manufactured by AZmax Co.).

In a preferred embodiment of the present invention, in addition to the silane-based coupling agents, titanium-based coupling agents can be used. As the titanium-based coupling agent, for example, isopropyl tri(N-amidoethyl-aminoethyl) titanate (Ajinomoto Co., Inc.) can be used.

Resin external electrode layer 28 includes a thermosetting resin and therefore, for example, has flexibility than the plating layers and base electrode layer 26. Therefore, even when a physical shock, or a shock due to a thermal cycle is applied to multilayer ceramic capacitor 10, resin external electrode layer 28 defines and functions as a buffer layer and can prevent cracks in multilayer ceramic capacitor 10.

As specific examples of the thermosetting resin included in resin external electrode layer 28, various known thermosetting resins, for example, epoxy resins, phenolic resins, urethane resins, silicone resins, or polyimide resins, can be used. Among them, epoxy resins having excellent heat resistance, moisture resistance, adhesiveness, and the like are suitable resins. Resin external electrode layer 28 preferably includes a curing agent together with the thermosetting resin. As the curing agent, various known compounds such as, for example, phenolic, amine-based, acid anhydride-based, or imidazole-based compounds can be used when an epoxy resin is used as the base resin.

As the metal powder included in resin external electrode layer 28, for example, a Ag powder, a Cu powder, or alloy powders thereof can be used. In addition, metal particles the surfaces of which are Ag-coated can be used, for example. When metal particles the surfaces of which are Ag-coated are used, for example, Cu or Ni is preferably used as the metal particles. Cu subjected to oxidation prevention treatment can also be used. The reason why Ag-coated metal particles are used is that the metal particles in the matrix can be inexpensive while the characteristics of the Ag are maintained. The metal powder included in resin external electrode layer 28 includes at least one of a Ag powder, a Cu powder, and a Ag-coated powder, for example.

The metal powder included in resin external electrode layer 28 is preferably included in, for example, an amount of about 35 vol % or more and about 75 vol % or less based on the volume of the entire resin external electrode layer 28. The shape of the metal powder (conductive filler) is not particularly limited. The metal powder may be a spherical metal powder or a flat metal powder, but a spherical metal powder and a flat metal powder are preferably mixed and used.

In that case, the proportion of the weight of the spherical metal powder to the weight of the metal powder (sphere ratio) is preferably about 70% or more and about 90% or less, for example. When the amount of the spherical metal powder is large, the air removal properties are good, and the void ratio of resin external electrode layer 28 decreases, but peeling easily occurs during the thermal cure shrinkage of the conductive paste for resin external electrodes in the manufacture of multilayer ceramic capacitor 10. Therefore, by mixing a flat metal powder in a predetermined proportion, the ease of peeling during thermal cure shrinkage can be reduced. When the mixing proportion of the flat metal powder is too large, the metal powder is far from being closely packed, and the organic solvent included in the conductive paste for resin external electrodes does not dry easily. The sphere ratio is calculated by sphere ratio={(weight of spherical metal powder)/(weight of spherical metal powder+weight of flat metal powder)}×100.

The average particle diameter of the metal powder may be, for example, about 0.3 μm or more and about 10.0 μm or less but is not particularly limited.

The metal powder included in resin external electrode layer 28 mainly has the current carrying properties of resin external electrode layer 28. Specifically, current carrying paths are provided inside resin external electrode layer 28 by the direct contact/tunnel effect of the metal powder particles. The tip of resin external electrode layer 28 preferably extends from the tip of base electrode layer 26 by, for example, about 10 μm or more and about 800 μm or less. Thus, the area of resin external electrode layer 28 to decrease stress during a thermal shock cycle can be sufficiently provided, and the advantageous effect of reducing solder cracks can be obtained.

Ni plating layers 30 include a first Ni plating layer 30a and a second Ni plating layer 30b.

First Ni plating layer 30a covers first resin external electrode layer 28a. Specifically, first Ni plating layer 30a is preferably provided on first end surface 12e on the surface of first resin external electrode layer 28a and also extends to first major surface 12a and second major surface 12b and first side surface 12c and second side surface 12d on the surface of first resin external electrode layer 28a.

Similarly, second Ni plating layer 30b covers second resin external electrode layer 28b. Specifically, second Ni plating layer 30b is preferably provided on second end surface 12f on the surface of second resin external electrode layer 28b and also extends to first major surface 12a and second major surface 12b and first side surface 12c and second side surface 12d on the surface of second resin external electrode layer 28b.

Sn plating layers 32 include a first Sn plating layer 32a and a second Sn plating layer 32b.

First Sn plating layer 32a covers first Ni plating layer 30a. Specifically, first Sn plating layer 32a is preferably provided on first end surface 12e on the surface of first Ni plating layer 30a and also extends to first major surface 12a and second major surface 12b and first side surface 12c and second side surface 12d on the surface of first Ni plating layer 30a.

Similarly, second Sn plating layer 32b covers second Ni plating layer 30b. Specifically, second Sn plating layer 32b is preferably provided on second end surface 12f on the surface of second Ni plating layer 30b and also extends to first major surface 12a and second major surface 12b and first side surface 12c and second side surface 12d on the surface of second Ni plating layer 30b.

Ni plating layer 30 covers the surfaces of base electrode layer 26 and resin external electrode layer 28, and thus base electrode layer 26 and resin external electrode layer 28 can be prevented from being eroded by solder used to mount when multilayer ceramic capacitor 10 is mounted. By providing Sn plating layer 32 on the surface of Ni plating layer 30, the wettability of solder used for mounting can be improved to provide easy mounting when multilayer ceramic capacitor 10 is mounted.

The thickness per plating layer is not particularly limited but is preferably about 1 μm or more and about 15 μm or less, for example.

The dimension in the length direction z of multilayer ceramic capacitor 10 including ceramic element body 12, first external electrode 24a, and second external electrode 24b is an L dimension. The dimension in the stacking direction x of multilayer ceramic capacitor 10 including ceramic element body 12, first external electrode 24a, and second external electrode 24b is a T dimension. The dimension in the width direction y of multilayer ceramic capacitor 10 including ceramic element body 12, first external electrode 24a, and second external electrode 24b is a W dimension.

For the dimensions of multilayer ceramic capacitor 10, for example, the L dimension in length direction z is about 0.6 mm or more and about 5.7 mm or less, the W dimension in width direction y is about 0.3 mm or more and about 5.0 mm or less, and the T dimension in stacking direction x is about 0.3 mm or more and about 3.0 mm or less.

2. Method for Manufacturing Multilayer Ceramic Electronic Component

Next, a non-limiting example of a preferred embodiment of a method for manufacturing the multilayer ceramic electronic component including the above-described configuration will be described using, as an example, multilayer ceramic capacitor 10 shown in FIG. 1.

First, ceramic green sheets for forming ceramic layers 14, a conductive paste for internal electrodes for forming internal electrode layers 16, and a conductive paste for external electrodes for forming the base electrode layers 26 of external electrodes 24 are provided. Organic binders and organic solvents are included in the ceramic green sheets, the conductive paste for internal electrodes, and the conductive paste for external electrodes, and known organic binders and organic solvents can be used.

Then, the conductive paste for internal electrodes is printed on the ceramic green sheets, for example, in a predetermined pattern, and internal electrode patterns are formed on the ceramic green sheets. The conductive paste for internal electrodes can be printed by a known method such as, for example, a screen printing method or a gravure printing method.

Next, a predetermined number of ceramic green sheets for outer layers on which internal electrode patterns are not formed are stacked, the ceramic green sheets on which the internal electrode patterns are formed are sequentially stacked on the ceramic green sheets for outer layers, a predetermined number of ceramic green sheets for outer layers are stacked on the ceramic green sheets on which the internal electrode patterns are formed, and a mother multilayer body is fabricated. This mother multilayer body may be pressure-bonded in stacking direction x by a measure such as, for example, isostatic pressing, as needed.

Subsequently, the mother multilayer body is cut into a predetermined shape and dimensions, and a raw multilayer body chip is cut. At this time, the edge portions and corner portions of the raw multilayer body chip may be rounded by barrel polishing or the like, for example. Then, the cut raw multilayer body chip is fired, and ceramic element body 12 is made. The firing temperature of the raw multilayer body chip depends on the material of the ceramic and the material of the conductive paste for internal electrodes but is preferably about 900° C. or more and about 1300° C. or less, for example.

Next, first external electrode 24a and second external electrode 24b are formed on the first end surface 12e and second end surface 12f of ceramic element body 12. That is, first, the paste for base electrode layers is applied to the first end surface 12e and second end surface 12f of ceramic element body 12 after the firing, and baked, and the first base electrode layer 26a of first external electrode 24a and the second base electrode layer 26b of second external electrode 24b are formed. The baking temperature is preferably about 700° C. or more and about 900° C. or less, for example.

Then, resin external electrode layers 28 are formed. A conductive paste for resin external electrodes including a silane coupling agent of any one or more selected from, for example, amine, isocyanate, epoxy, mercapto, and ureido silane coupling agents, a metal powder, and a thermosetting resin is applied so as to cover first base electrode layer 26a, and first resin external electrode layer 28a is formed. Similarly, the conductive paste for resin external electrodes including the silane coupling agent of any one or more selected from amine, isocyanate, epoxy, mercapto, and ureido silane coupling agents, the metal powder, and the thermosetting resin is applied so as to cover second base electrode layer 26b, and second resin external electrode layer 28b is formed.

In the conductive paste for resin external electrodes, the content of the amine, isocyanate, epoxy, mercapto, and/or ureido silane coupling agents can be determined by pyrolysis GC-MS. The content of the silane coupling agent based on the thermosetting resin is preferably about 0.1 wt % or more and about 10.0 wt % or less, for example.

The formation of resin external electrode layers 28 is performed by heat-treating the conductive paste for resin external electrodes at a temperature of about 80° C. or more and about 280° C. or less to thermally cure the thermosetting resin. The conductive paste for resin external electrodes is preferably heat-treated at a temperature of about 180° C. or more and about 230° C. or less, for example.

Next, Ni plating layers 30 are formed. First Ni plating layer 30a is formed so as to cover first resin external electrode layer 28a. Similarly, second Ni plating layer 30b is formed so as to cover second resin external electrode layer 28b.

Then, Sn plating layers 32 are formed. First Sn plating layer 32a is formed so as to cover first Ni plating layer 30a. Similarly, second Sn plating layer 32b is formed so as to cover second Ni plating layer 30b.

Multilayer ceramic capacitor 10 is manufactured as described above.

3. Experimental Examples

For multilayer ceramic capacitors, the measurement of the void ratio of the resin external electrode layer, the adhesiveness between the resin external electrode layers and the ceramic element body, and the deflection test and ESR measurement of the multilayer ceramic capacitors were performed.

In Comparative Example 1, a multilayer ceramic capacitor in which the surface of a metal powder was not covered with a surface treatment agent was fabricated. In Comparative Example 2, a multilayer ceramic capacitor in which the surface of a metal powder was covered with a stearic acid agent, a surface treatment agent, was fabricated. In Comparative Example 3, a multilayer ceramic capacitor in which the surface of a metal powder was covered with a stearylamine (long chain amine) agent, a surface treatment agent, was fabricated. In Comparative Example 4, a multilayer ceramic capacitor in which the surface of a metal powder was covered with a stearic acid+stearylamine agent, a surface treatment agent, was fabricated.

In Examples of preferred embodiments of the present invention, multilayer ceramic capacitors including resin external electrode layers including any one or more selected from amine, isocyanate, epoxy, mercapto, and ureido silane coupling agents were fabricated. The content of the silane coupling agent was about 1.0 wt % in all of the Examples, and when a plurality of silane coupling agents were included, the content of the silane coupling agents in total was about 1.0 wt %.

The specifications of the multilayer ceramic capacitors are as follows.
  Size L×W×T (design values): about 3.2 mm×about 2.5 mm×about 2.5 mm
  Ceramic material: $BaTiO_3$
  Capacitance: about 10 μF
  Rated voltage: about 25 V
  Internal electrode: Ni
  Structure of external electrode
  Base Electrode Layer
  Material of base electrode layer: conductive metal (Cu)
  Thickness of base electrode layer: about 65 μm (the thickest portion in the central portion of the end surface)
  Resin External Electrode Layer
  Metal powder (conductive filler): Ag-coated Cu
  Thermosetting resin: epoxy
  Surface treatment agent: for the treatment agent, see Table 1
  Thickness of resin external electrode layer: about 90 μm (the thickest portion in the central portion of the end surface)
  Ni plating layer: the thickness is about 5.0 μm
  Sn plating layer: the thickness is about 5.0 μm (1) Method for Measuring Void Ratio of Resin External Electrode Layer Each multilayer ceramic capacitor was processed by a focused ion beam (FIB) apparatus to expose a cross section of the multilayer ceramic capacitor, and SEM cross section observation in a reflected electron mode was performed. The ratio of the total of void areas per any area of the resin external electrode layer was obtained from the obtained SEM image. At the time, the portions that appeared white were taken as voids, and the total of void areas of each was obtained from image analysis.

(2) Method for Measuring Rate of Occurrence of Electrode Peeling

A multilayer ceramic capacitor was polished to a location of about ½ in the W direction to expose a cross section, and the presence or absence of electrode peeling by a metal microscope was observed. 100 Samples were observed, and the number of samples in which peeling off was confirmed was counted to obtain the rate of occurrence.

(3) Deflection Test Method

A sample of a multilayer ceramic capacitor was mounted on a JIS substrate (glass epoxy substrate) having a thickness of about 1.6 mm, using solder. The substrate was bent from the unmounted substrate surface by a pushing jig for the application of mechanical stress. At this time, the retention time was about 5 s, and the amount of bending was about 5 mm. After the substrate bending, the sample of the multilayer ceramic capacitor was removed from the substrate, cross section polishing was performed in the direction perpendicular to the substrate surface, and cracks in the ceramic element body were observed from the cross section. The proportion of samples in which cracks occurred was calculated. The number of samples is 10.

(4) Equivalent Series Resistance (ESR) Measurement

Equivalent series resistance (ESR) at a measurement frequency of about 10 MHz was measured.

The results of the void ratio of the resin external electrode layer and the rate of occurrence of electrode peeling for each of the multilayer ceramic capacitors, and the results of the deflection test and ESR measurement of the multilayer ceramic capacitors described above are shown in Table 1.

Next, for multilayer ceramic capacitors in which as the resin external electrode layers in which the content of the silane coupling agent was changed, the content of an amine silane coupling agent was changed, specimens were fabricated, and the measurement of the void ratio of the resin external electrode layer and the measurement of the adhesiveness between the resin external electrode layers and the ceramic element body were performed. The results are shown in Table 2.

TABLE 2

|  | Comparative Example 5 | Example 8 | Example 1 | Example 9 | Comparative Example 6 |
|---|---|---|---|---|---|
| Surface treatment agent | Amine silane coupling agent | | | | |
| Content [wt %] | 0.05 | 0.1 | 1.0 | 10.0 | 15.0 |

TABLE 1

|  | Metal powder | Surface treatment agent | Void ratio of resin external electrode layer [%] | Rate of occurrence of electrode peeling [%] | Rate of occurrence of cracks in element body seen from cross section after deflection test [%] | ESR (mΩ) |
|---|---|---|---|---|---|---|
| Comparative Example 1 | Ag-coated Cu | Untreated | 5.30 | 95 | 90 | 28 |
| Comparative Example 2 |  | Stearic acid | 3.50 | 80 | 60 | 21 |
| Comparative Example 3 |  | Stearylamine (long chain amine) | 5.01 | 89 | 90 | 30 |
| Comparative Example 4 |  | Stearic acid + Stearylamine | 5.00 | 85 | 90 | 28 |
| Example 1 |  | Amine silane coupling | 0.79 | 0 | 0 | 13 |
| Example 2 |  | Isocyanate silane coupling | 1.00 | 0 | 0 | 17 |
| Example 3 |  | Epoxy silane coupling | 0.85 | 0 | 0 | 13 |
| Example 4 |  | Mercapto silane coupling | 1.20 | 0 | 0 | 15 |
| Example 5 |  | Ureido silane coupling | 1.19 | 0 | 0 | 15 |
| Example 6 |  | Amine silane coupling + epoxy silane coupling | 1.02 | 0 | 0 | 16 |
| Example 7 |  | Isocyanate silane coupling + mercapto silane coupling | 1.05 | 0 | 0 | 17 |

As shown in Table 1, it was discovered that in Example 1 to Example 7, amine, isocyanate, epoxy, mercapto, and/or ureido silane coupling agents were included in the resin external electrode layers, and therefore the void ratio of the resin external electrode layer was about 0.79% or more and about 1.20% or less and lower than a threshold of about 2%. In addition, it was discovered that in Example 1 to Example 7, there was no occurrence of the peeling of the resin external electrode layers either. In addition, cracks in the ceramic element body after the deflection test did not occur, and further the ESR was about 13 mΩ or more and about 17 mΩ or less, and therefore good results were obtained.

On the other hand, in Comparative Example 1 to Comparative Example 4, the surface of the metal powder was untreated or covered with a stearic acid agent and/or a stearylamine agent, and therefore the void ratio of the resin external electrode layer was about 3.5% or more and about 5.3% or less and higher than a threshold of about 2%. In addition, in Comparative Example 1 to Comparative Example 4, the peeling of the resin external electrode layers occurred in a relatively high proportion. And cracks in the ceramic element body after the deflection test occurred in many samples, and further the ESR was about 21 mΩ or more and about 30 mΩ or less.

TABLE 2-continued

|  | Comparative Example 5 | Example 8 | Example 1 | Example 9 | Comparative Example 6 |
|---|---|---|---|---|---|
| Void ratio of resin external electrode layer [%] | 3.50 | 1.09 | 0.79 | 1.22 | 2.50 |
| Rate of occurrence of electrode peeling [%] | 21 | 0 | 0 | 0 | 5 |

As shown in Table 2, it was discovered that in Example 1, Example 8, and Example 9, about 0.1 wt % or more and about 10 wt % or less of the amine silane coupling agent was included in the resin external electrode layers, and therefore the void ratio of the resin external electrode layer was about 0.79% or more and about 1.22% or less and lower than a threshold of about 2%. In addition, it was found that in Example 1, Example 8, and Example 9, there was no occurrence of the peeling of the resin external electrode layers either.

In contrast, in Comparative Example 5 and Comparative Example 6, the void ratio of the resin external electrode layer was about 2.5% or more and about 3.5% or less and higher than a threshold of about 2%. In addition, in Comparative Example 5 and Comparative Example 6, the peeling of the resin external electrode layers occurred.

As described above, preferred embodiments of the present invention are disclosed in the above description, but the present invention is not limited to these.

That is, various changes can be made in the preferred embodiments described above regarding mechanisms, shapes, materials, quantities, positions, disposition, or the like without departing from the scope of the present invention, and they are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a ceramic element body including a plurality of ceramic layers, a plurality of internal electrode layers, a first major surface and a second major surface that face each other in a stacking direction, a first side surface and a second side surface that face each other in a width direction orthogonal or substantially orthogonal to the stacking direction, and a first end surface and a second end surface that face each other in a length direction orthogonal or substantially orthogonal to the stacking direction and the width direction; and
    a pair of external electrodes connected to the internal electrode layers and provided on the end surfaces, on the first and second major surfaces, and on the first and second side surfaces; wherein
    each of the pair of external electrodes includes a base electrode layer connected to the internal electrode layers, and a resin external electrode layer stacked on the base electrode layer;
    the resin external electrode layer includes a thermosetting resin, a metal powder, and a silane coupling agent including at least one of amine, isocyanate, epoxy, mercapto, or ureido silane coupling agents;
    the silane coupling agent covers at least a portion of a surface of a metal particle of the metal powder; and
    the silane coupling agent is provided at an interface between the thermosetting resin and the ceramic element body.

2. The multilayer ceramic electronic component according to claim 1, wherein the thermosetting resin includes an epoxy resin.

3. The multilayer ceramic electronic component according to claim 1, wherein in the resin external electrode layer, a content of the silane coupling agent based on the thermosetting resin is about 0.1 wt % or more and about 10 wt % or less.

4. The multilayer ceramic electronic component according to claim 1, further comprising a plating layer stacked on the resin external electrode layer.

5. The multilayer ceramic electronic component according to claim 4, wherein the plating layer includes Ni plating.

6. The multilayer ceramic electronic component according to claim 1, wherein the metal powder includes at least one of a Ag powder, a Cu powder, or an Ag-coated Cu powder.

7. The multilayer ceramic electronic component according to claim 1, wherein the multilayer ceramic electronic component is a multilayer ceramic capacitor.

8. The multilayer ceramic electronic component according to claim 1, wherein
    the plurality of ceramic layers include inner layer portions and first and second outer electrode layer portions sandwiching the inner layer portions; and
    each of the first and second outer layer portions has a thickness of about 20 μm or more and about 300 μm or less.

9. The multilayer ceramic electronic component according to claim 1, wherein a number of the plurality of ceramic layers is 15 or more and 1550 or less.

10. The multilayer ceramic electronic component according to claim 1, wherein each of the plurality of ceramic layers includes $BaTiO_3$, $CaTiO_3$, $SrTiO_3$, or $CaZrO3$ as a main component.

11. The multilayer ceramic electronic component according to claim 10, wherein each of the plurality of ceramic layers further includes a Mn compound, an Fe compound, a Cr compound, a Co compound, or a Ni compound as an accessory component.

12. The multilayer ceramic electronic component according to claim 1, wherein a thickness of each of the plurality of ceramic layers is about 0.48 μm or more and about 20 μm or less.

13. The multilayer ceramic electronic component according to claim 1, wherein each of the plurality of internal electrode layers is made of Ni, Cu, Ag, Pd, or Au, or an alloy including at least one of Ni, Cu, Ag, Pd, or Au.

14. The multilayer ceramic electronic component according to claim 1, wherein a thickness of each of the plurality of internal electrode layers is about 0.3 μm or more and about 2.0 μm or less.

15. The multilayer ceramic electronic component according to claim 1, wherein
    the base electrode layer includes a conductive metal and a glass component;
    the conductive metal includes at least one of Cu, Ni, Ag, Pb, a Ag—Pb alloy, or Au; and
    the glass component includes at least one of Si, Pd, Ba, Mg, Al, or Li.

* * * * *